United States Patent [19]

Moneghan

[11] 4,138,463
[45] * Feb. 6, 1979

[54] METHOD FOR FORMING SOLID FRICTION MATERIAL STRUCTURES

[75] Inventor: Edward E. Moneghan, Hatboro, Pa.

[73] Assignee: Pennwalt Corporation, Philadelphia, Pa.

[*] Notice: The portion of the term of this patent subsequent to Aug. 22, 1995, has been disclaimed.

[21] Appl. No.: 799,874

[22] Filed: May 23, 1977

Related U.S. Application Data

[62] Division of Ser. No. 633,054, Nov. 18, 1975, Pat. No. 4,108,935.

[51] Int. Cl.$^2$ .............................................. B29C 3/04
[52] U.S. Cl. .................................. 264/40.4; 264/40.7; 264/68; 264/111; 264/122; 264/323; 264/325
[58] Field of Search ..................... 264/325, 329, 40.4, 264/40.7, 68, 111, 122, 323

[56] References Cited

U.S. PATENT DOCUMENTS

| | | | |
|---|---|---|---|
| 2,647,283 | 8/1953 | Quear | 264/119 |
| 3,334,163 | 8/1967 | Gilbert | 264/122 |
| 3,505,446 | 4/1970 | Griffith | 264/122 |
| 3,661,485 | 5/1972 | Arpajian | 425/162 |

*Primary Examiner*—Thomas P. Pavelko
*Attorney, Agent, or Firm*—Charles N. Quinn

[57] ABSTRACT

An improved method is provided for forming rigid friction material structures from dry friction material having as major constituent elements substantial quantities of both asbestos fiber and thermosetting resin, whereby release of asbestos fibers to the atmosphere is substantially eliminated. The improved method builds upon known molding and charge preforming techniques which have been practiced using apparatus available heretofore.

18 Claims, 6 Drawing Figures

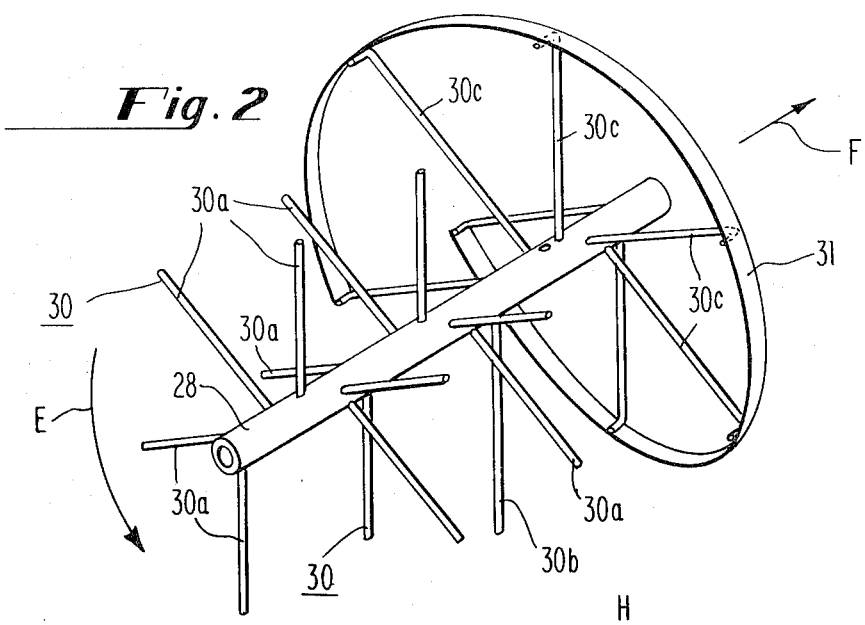
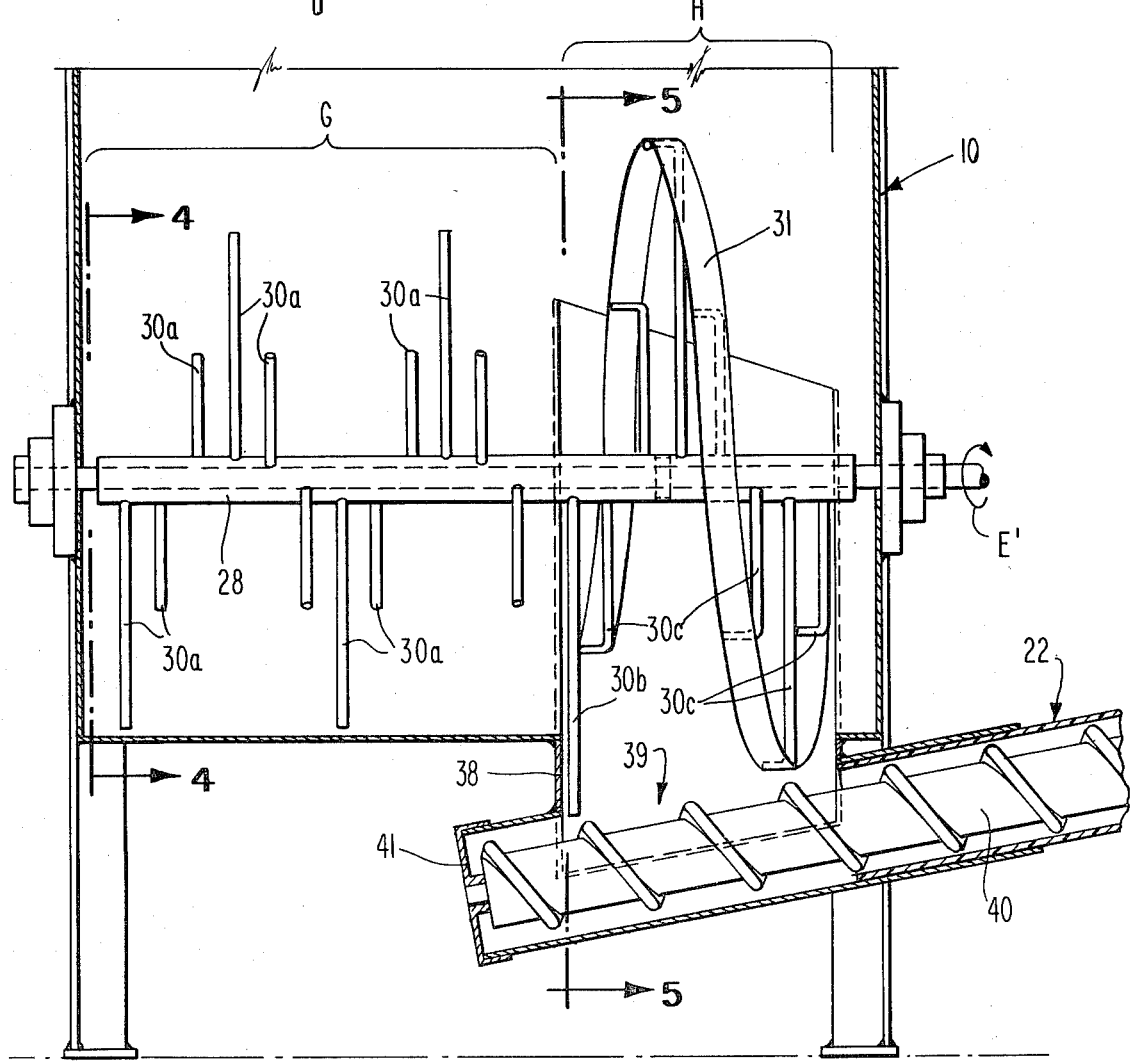

METHOD FOR FORMING SOLID FRICTION MATERIAL STRUCTURES

CROSS REFERENCE TO RELATED PATENT APPLICATION

This application is a division of U.S. Ser. No. 633,054, filed by Edward Moneghan, on Nov. 18, 1975, now U.S. Pat. No. 4,108,935 for Improved Method For Forming Solid Friction Material Structures, and assigned to Pennwalt Corporation.

BACKGROUND OF THE INVENTION

Field of the Invention

This invention relates to methods for forming dry, high bulk, friction materials into rigid structures which are substantially immediately useable in applications requiring friction resistant structures without further modification. More particularly, this invention relates to an improved method of producing substantially rigid, friction material structures in the form of brake shoes, disk brake pads, brake blocks and the like.

DESCRIPTION OF THE PRIOR ART

Initially, it is to be understood that the terms "friction material", "friction resistant material" and "energy dissipating material" are all used herein synonymously and interchangeably to denote those materials which, when formed into solid bodies, may be used in brakes and clutches for dissipating mechanical kinetic energy by frictional contact with another material, such as in uses where contact between the two materials takes place with a structure formed of one material in motion while the other structure is at rest and in applications where the friction material is slowly worn away by such contact. Friction materials include those materials employed for manufacture of brake shoes used in drum type brakes in automobiles, brake pads used in disk type brakes in automobiles, brake blocks used in brake assemblies of trucks, buses and other heavy vehicles, and brake blocks forming a part of brake assemblies used on railroad locomotives and railroad cars. Furthermore, friction material as used herein also encompasses those materials used for the manufacture of friction plates in clutches.

Also as used herein, it is to be understood that the terms "brake linings", "disk brake pads", and "brake blocks" mean molded bodies of friction resistant material which have been formed under heat and pressure into substantially rigid, solid structures which may be assembled into a brake system with a minimum of further machining after the application of heat and pressure. Disk brakes are rapidly replacing drum type brakes as standard equipment on passenger cars. Many automobiles now have disk brakes on the front wheels and an increasing number of automobiles have disk brakes both front and rear. Disk brakes are generally recognized to be better than drum type brakes. Disk brakes rapidly dissipate the heat which builds up during brake application due to the frictional contact between the brake pad, manufactured of friction material, and the moving surface against which the brake pad is applied. Disk brakes dissipate heat faster than do conventional drum type brakes, thereby reducing the heat build-up in the brake material which can produce brake fade. Brake fade is the phenomenon whereby resistance to motion produced when friction material is pressed against a moving surface is reduced due to the friction material becoming slightly fluidized and, therefore, lubricated. Since heat builds up on every application of brakes, it is desirable to dissipate the heat rapidly, thereby permitting more frequent application of a vehicle's brakes without danger. Thus, an automobile or other vehicle equipped with disk type brakes can be stopped more quickly and more often than an automobile equipped with conventional drum type brakes.

A second major advantage of disk brakes over drum brakes is that disk brakes dry more quickly than drum type brakes after exposure to the lubricating effects of water.

With increasingly stringent federal safety standards, an increased demand for disk brakes in motor vehicles is expected.

Disk brake assemblies and disk brake friction material pads for insertion therein have a substantially different configuration than do drum brake friction material inserts. Because of this, it has not proven feasible to simply modify the present highly developed methods, techniques and procedures for the manufacture of friction material inserts for drum brakes to the efficient manufacture of disk brake pads. The technology for manufacture of drum brake friction material inserts has developed to a highly efficient, productive, substantially continuous procedure, which typically involves extrusion and impregnation of tape-type material with the friction material, whereupon the combination is molded or otherwise formed into the drum brake lining or drum brake friction material insert.

The configuration requirements of truck brake blocks and railroad brake shoes and the density of friction material required therefor have also required that non-continuous methods of manufacture such as molding be utilized. These methods are substantially the same as those used for the manufacture of automobile disk brake friction material inserts or pads.

Presses for molding friction materials under predetermined heat and pressure conditions have been used commercially since at least 1965. For example, since 1965 Raybestos Corporation has used molding and feeding apparatus substantially as disclosed in U.S. Pat. Nos. 3,278,992 and 3,225,963 for feeding, heating, forming precharges and molding friction materials into finished rigid friction material structures. U.S. Pat. No. 3,278,992 of W. Strauss, entitled "Molding Apparatus" granted Oct. 18, 1966 and assigned to Pennwalt Corporation is sometimes referred to hereinafter as the "3,278,992 patent" or similarly. U.S. Pat. No. 3,225,963 of V. F. Arpajian, entitled "Hopper Apparatus and Method", granted Dec. 28, 1965 and assigned to Pennwalt Corporation, is sometimes referred to hereinafter as the "3,225,963 patent" or similarly. The disclosures of the 3,278,992 and 3,225,963 patents are hereby incorporated herein by reference.

Prior to such use of molding apparatus and associated hopper apparatus for forming friction materials into rigid bodies, the earlier process by which rigid friction material bodies were formed comprised the steps described immediately below.

Initially, according to prior practice, batches of friction materials were mixed according to known recipes in closed mixers, and then discharged either continuously or in bulk from the mixers into closed containers. A typical recipe for friction materials included substantial percentages of asbestos (40 to 70%) and binder material (10 to 30%), along with smaller percentages (up to 50%) of various metallic oxides and the like to provide reasonable life for the finished friction material product. A summary of the problems involved in formulating an appropriate friction material recipe is contained in the paper *Automotive Brake Lining Materials* by A. J. Carter presented at the annular meeting of the Society of Automotive Engineers in January of 1950. The disclosure of that paper is incorporated herein by reference.

The second step of the process as known prior to 1965 was to transfer closed containers of the mixed friction material by conveyor or truck from the mixer to a preformer.

The next step was to feed the friction material in the mixed state into a preformer. Typically, closed containers of mixed friction material would be fed by hand from the top of a preform machine into the preformer. This step of the process necessarily involved human contact with the brake material which was undesirable due to the health hazards involved in handling asbestos. Additionally, during this dusty operation the individuals feeding the preformer were exposed to the risk of inhaling or ingesting asbestos dust.

Due to the lofty nature of the friction material mixture, and the asbestos therein in particular, it was previously necessary to compress a relatively large volume of the mixture into a solid form. The solid form was next subdivided by trimming into so called cold preforms. Each preform was sized to fit into a mold cavity. The disadvantage of this prior practice is that asbestos dust was released into the shop atmosphere during the steps of compressing the solid form and trimming it into preforms.

The next step was to manually transfer the trimmed preforms in closed boxes from the trimming station to a molding press, thereby exposing personnel to the dust created by bumping the preforms about in transit.

The next step in the process was that of loading a molding press with the trimmed preforms.

The followng step was to mold the preforms under pressure and heat. This step consolidated the loose asbestos fibers with the binder and produced a substantially dustless product.

The next step was that of transferring the molded rigid friction material structures from the molding press to a baking oven for post molding cure. Open conveyors or pallets were used for this transferring step.

Finally, the molded rigid friction material bodies were cured in a bake oven.

THE DUST-FREE FORMATION OF PREFORMS

Upon introduction of the apparatus described in the 3,278,992 and 3,225,963 patents, substantial improvements were possible in the method for manufacturing the rigid friction material bodies. The step of mixing the recipe materials and transferring the mixture to the preformer did not change. The step of feeding the preformer now was performed automatically by machine. This step and the subsequent steps which once had resulted in substantial release of asbestos material to the atmosphere, were substantially improved in efficiency by incorporation of the transfer molding press and hopper apparatus described in the two patents. Specifically, the step of feeding the preformer was now performed in a totally enclosed environment. Referring to FIG. 1 of the 3,278,992 patent, the screw 40, upon rotation, fed material from the hopper into the accumulation zone 46 in a partially plasticized state by applying rotational motion to the mixed friction material. Once screw 40 had moved to the right thereby advancing the at least partially plasticized material into accumulation zone 46, the screw would be advanced by piston 102 thereby forcing the material from accumulation zone 46 into transfer pot 50. See column 6, line 39 of the 3,278,992 patent. Due to the lofty nature of the material while in the hopper 42 it would not freely flow through opening 45 shown in FIG. 1 of 3,278,992. In response to this problem an apparatus and a method were developed to successfully feed the lofty material into the small screw opening by starve feeding a hopper equipped with a plunger. This is the apparatus shown in the 3,225,963 patent and the method of feeding is claimed therein.

The step of preforming the friction material went from a cold process to a hot process due to the use of the rotating plasticizing screw 40 shown in FIG. 1 of the 3,278,992 patent. This allowed production of a preform with an accurately determined repeatable mass which did not require trimming. Thus, the step of trimming the preform was now omitted. Use of this apparatus also meant that the step of transferring the preform to the molding press was performed in a closed environment, with consequent elimination of the dust problem. Referring to the 3,278,992 patent, advancement of piston 56 served to force the preform from transfer pot 50 through runners 21 into mold cavities 17 and 18 in a completely enclosed preform transfer process. Thus the step of loading the molding press was performed in a closed environment, again with consequent elimination of the dust hazard. Removal of the molded friction material rigid bodies from the press was performed automatically by knock-out pins 23. No change was made in the step of transferring the molded rigid friction material bodies from the molding press to the bake ovens, or in the step of baking the molded rigid friction material bodies to effect final cure.

The process for manufacturing molded friction material structures utilizing the combination of apparatus shown in the 3,278,992 and 3,225,963 patents was used commercially. The limiting factor was that as the preform was forced from a transfer pot, of the type designated by the numeral 50 in FIG. 1 of 3,278,992, into mold cavities 17 and 18, the preform had to be divided for travel through two mold runners 19 and 21. This required a right angle turn by the divided portions of the preform. This much of the transfer process from the preform area or transfer pot 50 into the mold cavities limited the length of asbestos fibers which could be successfully forced around the ninety degree angle. This asbestos fiber length limitation, in turn, limited the strength of the brake pad which was manufactured.

Utilization of the molding method inherent in the 3,278,992 apparatus increased the cost of manufacturing rigid molded friction material bodies. However, the molding procedure made it possible to produce a higher quality finished product. This higher quality resulted primarily from increased density of friction material in the mold cavity. Referring to FIG. 1 of 3,278,992, the increase in density was achieved by at least partially plasticizing the friction material with screw 40 as the partially plasticized friction material was force fed into the preform accumulation zone 46. An additional benefit was that several steps of the process, which previously resulted in the undesirable release of brake material dust to the environment, were either eliminated or were performed entirely within the machine.

Several approaches were employed in solving the dust problem associated with those steps of the process not performed inherently by the combination of the apparatus as shown in the 3,278,992 patent and the 3,225,963 patent. One approach was to build housings around those regions where friction material dust was released during the performance of a process step, thereby providing a closed environment at those regions. Such housings or other enclosures were generally provided with forced air circulating systems and with filtration means to collect any airborne asbestos fibers circulating within the closed environment. Other approaches included requiring those workers who were exposed to friction dust to wear fiber filtration face mask apparatus and various kinds of protective clothing while performing steps of the process which release such dust.

Another, quite old, approach to preventing the release of friction material dust into the atmosphere was to wet the friction material during the mixing step. Wetted asbestos fibers are unlikely to separate from the main body of the friction material recipe mixture, and hence they are unlikely to become airborne while rigid friction material structures are being formed. These wetting procedures introduced a wetting ingredient to the recipe during the mixing step. This approach generally eliminated the need for a closed environment for the performance of those steps subsequent to the mixing step; however, the wetting approach created new problems. The wetting agent usually was a material which had to be removed from the basic friction material recipe before curing could be completed.

Typically, a solvent for the resin binder constituent of the friction material recipe was used as the wetting agent. The solvent had to be vaporized and driven off during cure. This requirement complicated the molding procedure by introducing the necessity for "breathing the mold". This was a procedure whereby the mold was opened during the molding cycle so that the solvent vapors produced could escape from the mold. Breathing the mold increased the overall time required for molding the rigid friction material bodies, with consequent loss in manufacturing efficiency.

A further disadvantage of the wetting technique was that gaseous vapors of the wetting ingredient sometimes formed within the molded parts thus creating voids and consequent structural weakness. This tendency was minimized when the apparatus shown in the 3,278,992 patent was used because much of the wetting agent would be driven off as vapor during the preforming process. However, some wetting agent would remain because the friction material temperature reached during the preforming process, typically from 220° to 250° F., was not high enough to drive off all the wetting agent. Friction material temperatures in the mold cavities were typically on the order of 100° F. higher than at the preform forming station; consequently, some wetting material was invariably vaporized in the mold with attendant need for breathing the mold.

The problems encountered when attempting to utilize wetting techniques in combination with mold apparatus such as shown in the 3,278,992 patent generally added such complexity and resultant cost to the process that the advantages gained in reducing asbestos emissions to the atmosphere were substantially negated. Systems designed to remove the wetting agent from the preform prior to molding so that the volatile ingredients were substantially absent during molding were not successful. Accordingly, the usual approach to the elimination of friction material dust has been to utilize molding apparatus such as that shown in the 3,278,992 patent while dealing with the dust problem separately at those exposed locations where dust release occurs in connection with the performance of steps of the method.

In addition to the dust problem, the apparatus described in the 3,278,992 patent solved a second major problem in the previously used method for molding friction material, by partially plasticizing the material into a charge having a predetermined uniform and repeatable mass and then forcing that charge into mold cavities. This obviated the prior problem of weighing and measuring the mixed friction material in its lofty state wherein the lofty characteristic made it difficult to repeatedly obtain the required predetermined mass for molding. By at least partially plasticizing the friction material, a composition of substantially constant density results. By measuring a given volume of the partially plasticized substantially constant density material into accumulation zone 46 in the apparatus shown in the 3,278,992 patent, rather than measuring a volume or mass of the material when it is in the lofty state, substantially the same moldable mass is obtained for each stroke of the press.

In an attempt to solve the problem whereby the partially plasticized charge could negotiate the right angle bend in the mold runners of the 3,278,992 patent apparatus only if the charge contained asbestos fibers of less than a critical length, in 1971 the apparatus described in U.S. Pat. No. 3,661,485, in combination with the apparatus described in the 3,225,963 patent, was utilized for manufacturing molded, rigid, friction material structures. U.S. Pat. No. 3,661,485 was granted May 2, 1972 in the names of V. F. Arpajian and Q. M. White with the title "Compression Molding System" to Pennwalt Corporation as assignee, and such patent is sometimes referred to herein as the "3,661,485 patent" or similarly. The disclosure of the 3,661,485 patent is hereby incorporated herein by reference. The 3,661,485 apparatus formed the partially plasticized charges in cups and then dropped the charges into the mold cavities while the mold was open. Additionally the 3,661,485 apparatus, like the 3,278,992 apparatus, plasticized material into a preform of predetermined mass which was not prone to release asbestos fiber into the atmosphere, and fed the preform into a mold cavity also without release of asbestos fiber into the atmosphere.

Upon incorporation of the 3,225,963 hopper and vibratory tray apparatus into the 3,661,485 compression molding system, some changes became extant in the method for molding rigid friction material structures. The steps of mixing the friction material recipe, transferring the recipe to a hopper for feeding a preformer and feeding the preformer were not changed. In the preforming step, a screw device similar to the one in the 3,278,992 apparatus was used; the 3,661,485 screw device had the capability of forming multiple preforms simultaneously. Again, the step of preform trimming was no longer required. Transferring the preforms to the molding press was now performed by loading a reciprocable tray which delivered the preforms to the cavities in the mold. The step of loading the molding press was incorporated into the step of transferring the preforms from the preformer to the mold cavities. Thus, in proceeding from the 3,278,992 patent to the 3,661,485 patent, no significant changes were made in the process steps of molding the preforms, removing them from the press and curing them in a baking oven.

The 3,661,485 apparatus permitted the degree of plasticization of the preform to be adjustably controlled by varying the annular spacing between the conical leading edge of the plasticizing screw and the tapered front wall of the cylinder bore adjacent orifice 62 shown in FIGS. 1, and 5 through 9, of the 3,661,485 patent. The preforms were formed into bell-shaped masses or wads. The extrusion cylinders had flat, blunt discharge nozzles which cooperated with preform cups to capture the plasticized material extruded from the nozzles and to form the extruded material into the bell-shaped masses or wads. See FIGS. 5 through 9 of the 3,661,485 patent for details of the formation of the preforms.

This practice provided great advantage because of the inherently peculiar nature of the friction material recipe, particularly its lofty or fluffy physical characteristic. Beside the asbestos fiber constituent of the friction material recipe, there is also thermosetting resinous binder which is usually of the phenolic type, and also dry particulate ingredients in small percentages. These small percentages can be slightly changed to modify various friction characteristics of the finished rigid friction material structure. In all recipes generally employed for formulating the friction material mixture, a substantial amount of asbestos fiber is utilized. This invariably results in the mixed recipe being light and fluffy. This fluffiness or loftiness of the mixed recipe of dry ingredients prohibits the establishment of any uniform density flow of mixed friction material which could be divided into equal volumes, thereby providing fixed amounts of material in each volume for loading into a mold cavity. Furthermore, due to the lofty, fluffy nature of the material in this state, excessively large mold cavities would be required just to receive the appropriate charge of friction material. If the friction material were loaded into the mold cavities in such a state, it would be compressed, in the press, to a volume many times less than the volume of the charge. This would produce problems in the molding process and hence would be undesirable.

The 3,661,485 apparatus is one apparatus used today which incorporates preform procedures, thereby solving the problem of ensuring a uniform density of the final product. The 3,661,485 apparatus successively partially plasticizes the mixed friction material recipe, successively measures incremental amounts from the plasticized portion of the supply of the lofty, fluffy mixture into measuring cups, and compresses the successively measured incremental amounts in the preform cups to form preforms or charges of compressed yet still uncured friction material which have a shape quite similar to the shape of the cavities in the mold associated with the 3,661,485 press. An advantage inherent in the preform forming process practiced by the 3,661,485 apparatus is that the cycle time for the formation of preforms is shorter than the cycle time for the molding of the preforms in the press.

The compressed, partially plasticized condition of the preforms formed by the 3,661,485 apparatus materially reduces the tendency for asbestos fibers to become airborne. Not only does the plasticized state of the preform reduce airborne asbestos fibers; but also forming the preforms at a location proximate to the molding press, thereby reducing the need for handling, them minimizes the tendency for any asbestos fibers to become airborne. Accordingly, if the problem to be solved is viewed as one only of minimizing airborne asbestos fibers, use of the 3,661,485 apparatus confines this problem to that location where the lofty, fluffy fibers are handled prior to feeding into contact with the plasticizing screw.

One approach to feeding the plasticizing screw was to combine the hopper apparatus of the 3,225,963 patent with the plasticizing apparatus and press of the 3,661,485 patent, by replacing the hopper 52 and feed line 60 shown in the 3,661,485 patent with the hopper 14, vibratory tray 22 and stuffer mechanism 36 shown in the 3,225,963 patent. This combined apparatus did not change the steps of the method of molding rigid friction material structures, but it did modify the means of transferring the mixed friction material recipe from the mixing apparatus to the preformer. The lofty, fluffy nature of the mixed friction material prevented it from successfully feeding from hopper 12 via vibratory tray 22 to hopper 14 shown in the 3,225,963 patent. In order to more successfully feed stuffer hopper 14 of the 3,225,963 patent, the vibratory tray 22 and hopper 12 of 3,225,963 were eliminated and hopper 14 was fed directly. Various air conveyors were tried as means to feed the stuffer hopper 14, shown in the 3,225,963 patent, when the hopper was located atop the 3,661,485 plasticizer and press. Air conveyors have not proven sufficiently controllable for accurately feeding a precise, predetermined amount of friction material mixture into the stuffer hopper. If too much fluffy friction material is fed into the stuffer hopper, the stuffer or plunger creates a hole in the center of the material and material builds up around the hole defining travel of the stuffer or plunger. This phenomenon is referred to as "rat holing". Ultimately, as rat holing increases, too little material is fed to the plasticizing screw whereupon the material in contact with the screw overheats and prematurely begins to cure. This makes accurate forming of acceptable preforms impossible. Similarly, if too little friction material mixture is fed to the stuffer hopper, the plunger cannot force sufficient friction material into contact with the screw for plasticization, again resulting in overheating the friction material and consequent unacceptable preforms. Air conveyors consistently proved to be unsuitable for "starve" feeding the stuffer hopper.

A further problem inherent in air conveyors is the release of asbestos fibers and asbestos dust to the environment, contrary to OSHA regulations.

An indication of the difficulties solved by the present invention and present in the manufacture of molded rigid friction material structures can be found in a paper entitled *The Manufacture of Disc Brake Linings*, presented in February of 1975 by Gerald R. Russell to the Automotive Engineering Congress and Exposition in Detroit, Michigan and published by the Society of Automotive Engineers. This paper specifically addresses the problem of preform trimming which has been eliminated by the method inherently practiced by the apparatus shown in the 3,661,485 patent. The disclosure of the Russell paper is hereby incorporated herein by reference.

SUMMARY OF THE INVENTION

Heretofore, it has not been known to provide in a method for manufacturing rigid friction material structures of the type set forth, the step of progressively withdrawing mixed friction material from a remotely located supply and feeding it to the preforming location along a closed path. Optionally, but preferably, heat and pressure are applied to the material along at lest a portion of the closed path. At the end of the closed path is a location at which at least partially plasticized preforms are formed from an accurately predetermined mass of friction material.

BRIEF DESCRIPTION OF THE DRAWINGS

FIG. 2 is an enlarged isometric view of a rotatable horizontal shaft removed from the agitator portion of the apparatus of FIG. 1.

FIG. 3 is an enlarged, vertical side sectional view of the agitator portion of the apparatus of FIG. 1, with internal parts shown in elevation.

DESCRIPTION OF THE PREFERRED EMBODIMENTS

Figure 1:
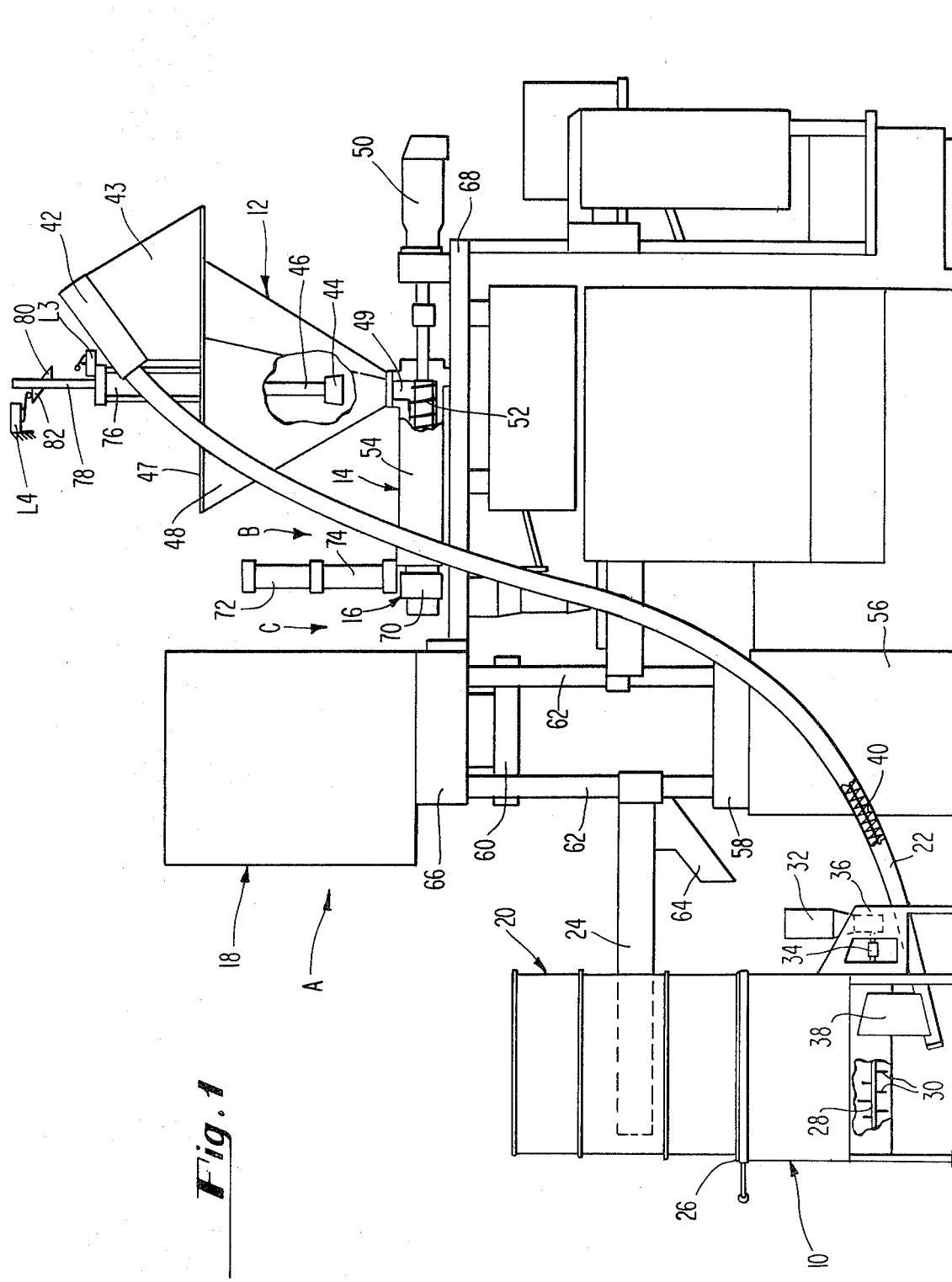
FIG. 1 is a side view of a preferred embodiment of apparatus for practice of the method invention.

Reference is made to FIG. 1 wherein there is shown a preferred embodiment of novel apparatus for performing the method of the present invention. Container 20 containing the friction material recipe, preferably already premixed, is preferably mounted atop agitator 10 for release thereinto of friction material. Agitator 10 is connected to stuffer hopper 48 of a stuffer assembly 12 by feed means 22 through which the agitated mix of friction material recipe is transferred to stuffer hopper 48. Stuffer hopper 48 is mounted atop extruder portion 14 for delivery of mixed friction material recipe thereinto. Extruder 14 has preforming means 16 affixed proximate to one end thereof for the receipt of partially plasticized friction material. Compression molding press 18 molds the friction material preforms into the final molded product.

Container 20 can be of any suitable form, for example it can be a mixing container as used for mixing the friction material recipe at a remote station, or it can be merely a transport container used to transport the mixed friction material recipe from a remote mixing station to the agitator 10. Container 20 is preferably adapted for mounting on top of agitator 10 for direct and closed transfer of friction material recipe into agitator 10, without release of any dust or fine particulate matter from the friction material into the atmosphere. Container 20 is retained atop agitator 10 as required by any suitable connecting means. Sealing means 26 may be provided at the juncture of container 20 and agitator 10 in order to assure that no dust or fine particulate friction material escapes into the atmosphere during transfer of the mixture from container 20 to the agitator 10. A suitable cover (not shown) may be used in place of sealing means 26 to close the open top of the agitator after the container is empty.

Agitator 10 has disposed therewithin a horizontal shaft 28 which has a plurality of fingers 30 extending radially and perpendicularly therefrom. Horizontal shaft 28 is driven by motor 32, which is preferably an electric motor, through gear reduction means enclosed within housing 36. In FIG. 1, agitator 10 has been broken away to show horizontal shaft 28 and several of the attached fingers 30. Agitator 10 has extending downwardly therefrom a duct 38 for guiding the mixed and agitated friction material recipe contained in the agitator 10 into feed means in the form of a flexible feeder 22. Flexible feeder 22 has therein a flexible, continuous screw 40 of the auger type.

Flexible screw 40 is driven by a hydraulic motor 42 which, in the embodiment shown in FIG. 1, is mounted at an end of flexible screw 40 remote from agitator 10. It is to be understood that hydraulic motor 42 could equally well be mounted at the end of flexible screw 40 proximate to agitator 10. Hydraulic motor 42 is mounted on a mounting bracket 43 which in turn is affixed to stuffer hopper 48. Bracket 43, in addition to supporting hydraulic motor 42, is constructed in such a way that it encloses the end of flexible screw 40 from which transported friction material drops into stuffer hopper 48. A cover 47 covers the top of stuffer hopper 48 so that no friction material can escape to the air as it drops into stuffer hopper 48. Stuffer hopper 48 has been partially broken away in FIG. 1 in order to show a plunger 44 secured to the lower end of an upright, vertical shaft 46 for unitary motion therewith. The plunger 44 and the shaft 46 reciprocate vertically, thereby serving to stuff friction material in the downwardly tapered stuffer hopper 48 through an orifice 49 at the lower end thereof into contact with rotatable plasticizing screw 52. The plunger 44 and the shaft 46 are driven by an air cylinder 76 located above stuffer hopper 48.

The plasticizing portion of the apparatus has been designated generally by arrow B and comprises plasticizing screw 52 mounted for rotational motion within plasticizing screw housing 54. Plasticizing screw 52 is driven by a hydraulic motor 50. The screw 52, housing 54 and motor 50 comprise an assembly providing an extruder 14. The extruder 14 is mounted on a bed plate 68, and it is described in greater detail beginning at column 2, line 26 of the 3,661,485 patent.

At least one preform cup 70 is moveably disposed at the end of plasticizing screw 52 for receipt therein of at least partially plasticized material exiting from an orifice at the end of plasticizing screw housing 54. An air cylinder 72 is disposed above the juncture of cup 70 and housing 54. A housing 74 encloses a guillotine knife (not shown) which is driven by the air cylinder 72 from its retracted position downwardly to a position between the preform cup and the plasticizing screw housing. This assembly is referred to as the preforming section; a detailed description of the preforming section, as well as a description of means for transferring preforms to a molding press, may be found beginning at column 2, line 51 of the 3,661,485 patent.

Reference is now made to the molding press 18 shown in FIG. 1. The press 18 has a base 56 upon which stationary platen 58 is mounted. Disposed above stationary platen 58 on connecting guide posts 62 is a moveable platen 60. Mold halves, which are not shown, are disposed on the two platens. It is in the mold cavities defined by these mold halves that the rigid friction material bodies are formed when preforms of friction material are placed into the respective mold cavities, the mold halves are brought together, and heat and pressure are applied. Duct 64 is provided, preferably adjustably affixed to one of guide posts 62, for transferring the molded rigid friction material bodies away from the press once molding is complete. A hydraulic cylinder contained in hydraulic cylinder enclosure 66 provides for vertical movement of moveable platen 60. Details of the press 18 may be found beginning at column 2, line 42 of U.S. Pat. No. 3,741,699, entitled "Variable Volume and Controlled Density Forming Mechanism for Compression Molding Presses", granted June 26, 1973 and assigned to Pennwalt Corporation. This patent is sometimes referred to hereinafter as the "3,741,699 patent" or similarly. The sequence of operation of the molding press is described beginning at column 5, line 5 of the 3,661,485 patent. Electrical circuitry for control of the press and the performing operation is described beginning at column 4, line 43 of the 3,661,485 patent.

Extending upwardly in a vertical direction from a reciprocable piston contained in air cylinder 76, is rod 78, which has selectably adjustable upper and lower cam means 82 and 80 affixed thereto for unitary movement therewith. Upper cam means 82 actuates an upper limit switch L4, while lower cam means 80 actuates a lower limit switch L3. Upper and lower limit switches L4 and L3 are momentarily actuated while engaged by their respective, associated cam means during reciprocation or rod 78.

Reference is now made to FIGS. 2 and 3 wherein the horizontal shaft 28 of the agitator 10 is shown with a plurality of fingers 30, also denotes 30a, 30b and 30c, protruding therefrom in a radial direction, with ribbon 31 helically formed about and affixed to the extremities of fingers 30c. Within agitator 10 horizontal shaft 28 rotates in the direction shown by arrow E. Radially extending fingers 30a and radially extending finger 30b serve to continuously agitate and mix the friction material in agitator 10. The fingers 30c are each of different length. The radially extending fingers 30c are arranged extending from horizontal shaft 28 in order of decreasing length as one moves in the axial direction denoted by arrow F. Due to the helical shape of ribbon 31, as horizontal shaft 28 is rotated through the friction material present in agitator 10, friction material in the neighborhood H of helical ribbon 31 will be urged in the direction denoted by arrow F. Friction material remote from the helical ribbon, proximate to fingers 30a, will then move in the direction denoted by arrow F, to fill the void created when the material more proximate to ribbon 31 has dropped through duct 38 into the inlet 39 of the feeder 22 for removal by flexible screw 40.

Feeder 22 is provided with end sealing means 41 to close the lower end of flexible feeder 22 so that no dust or friction material can escape therefrom. In the area of agitator 10 along horizontal shaft 28 denoted by bracket G, equal length fingers 30a serve to agitate the friction material and maintain it in a light, homogeneous condition. In the area denoted by bracket H, extended length finger 30b in combination with the plurality of fingers 30c serve to draw friction material from the area denoted by bracket G into the area denoted by bracket H.

Figure 4:
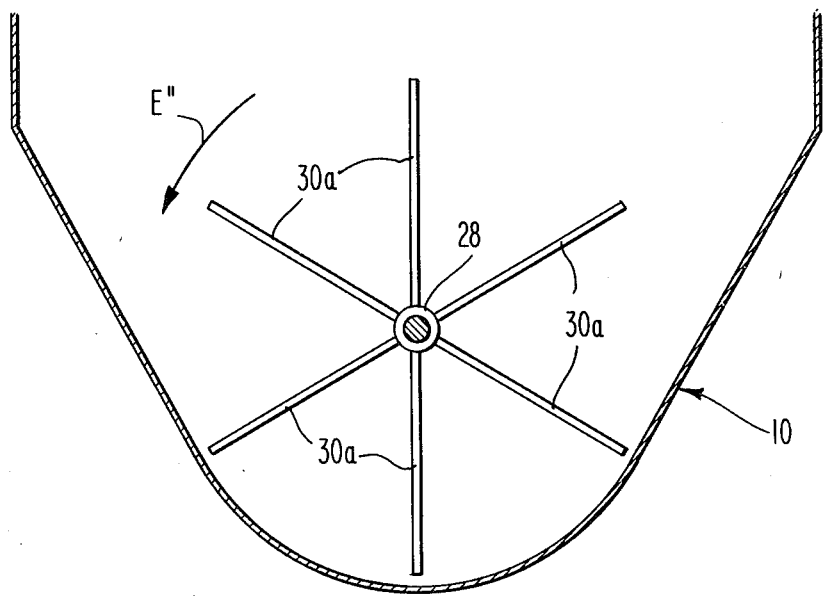
FIG. 4 is a vertical sectional view of the agitator portion of the apparatus of FIG. 1, taken along the line 4—4 in FIG. 3.

Reference is now made to FIG. 4 wherein there is shown an end view of horizontal shaft 28 with six equal length fingers 30a extending radially therefrom. It should be noted that the fingers 30a are closely spaced to the wall of agitator 10 to maintain substantially all the friction material in agitator 10 in an agitated, fluffed, homogeneous state. The direction of rotation of horizontal shaft 28 is denoted by arrow E''.

Figure 5:
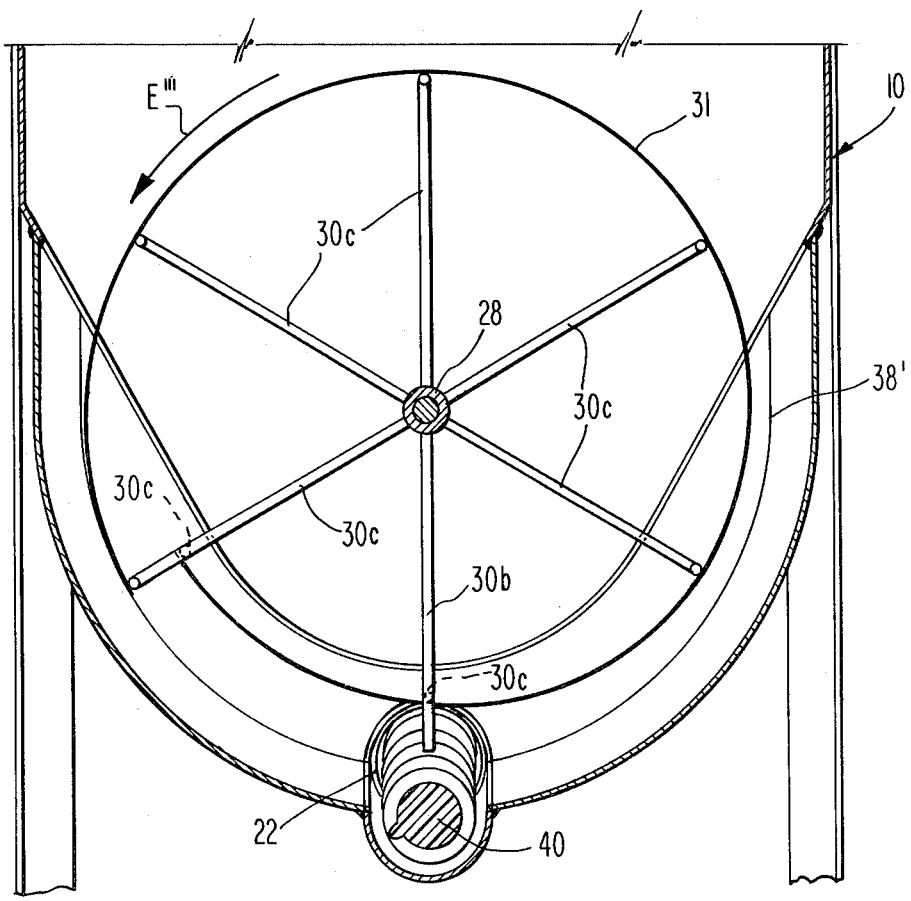
FIG. 5 is another vertical sectional view of the agitator portion of the apparatus of FIG. 1, taken along the line 5—5 in FIG. 3.

Reference is now made to FIG. 5 which is another sectional view taken through agitator 10 showing horizontal shaft 28 and fingers 30c whose ends form the helical path for helical ribbon 31. In FIG. 5, the direction of rotation of horizontal shaft 28 is shown by arrow E'''. The projection of the edge of the duct 38 is denoted as 38'. As shaft 28 rotates in the direction shown, a corkscrew-type action by helical ribbon 31 upon the agitated homogeneous friction material in agitator 10 will result in the friction material gathering together in the neighborhood of helical ribbon 31. Due to this action and the force of gravity, friction material will fall downward into proximity with flexible screw 40 which will remove the friction material from agitator 10 along a closed path.

Figure 6:
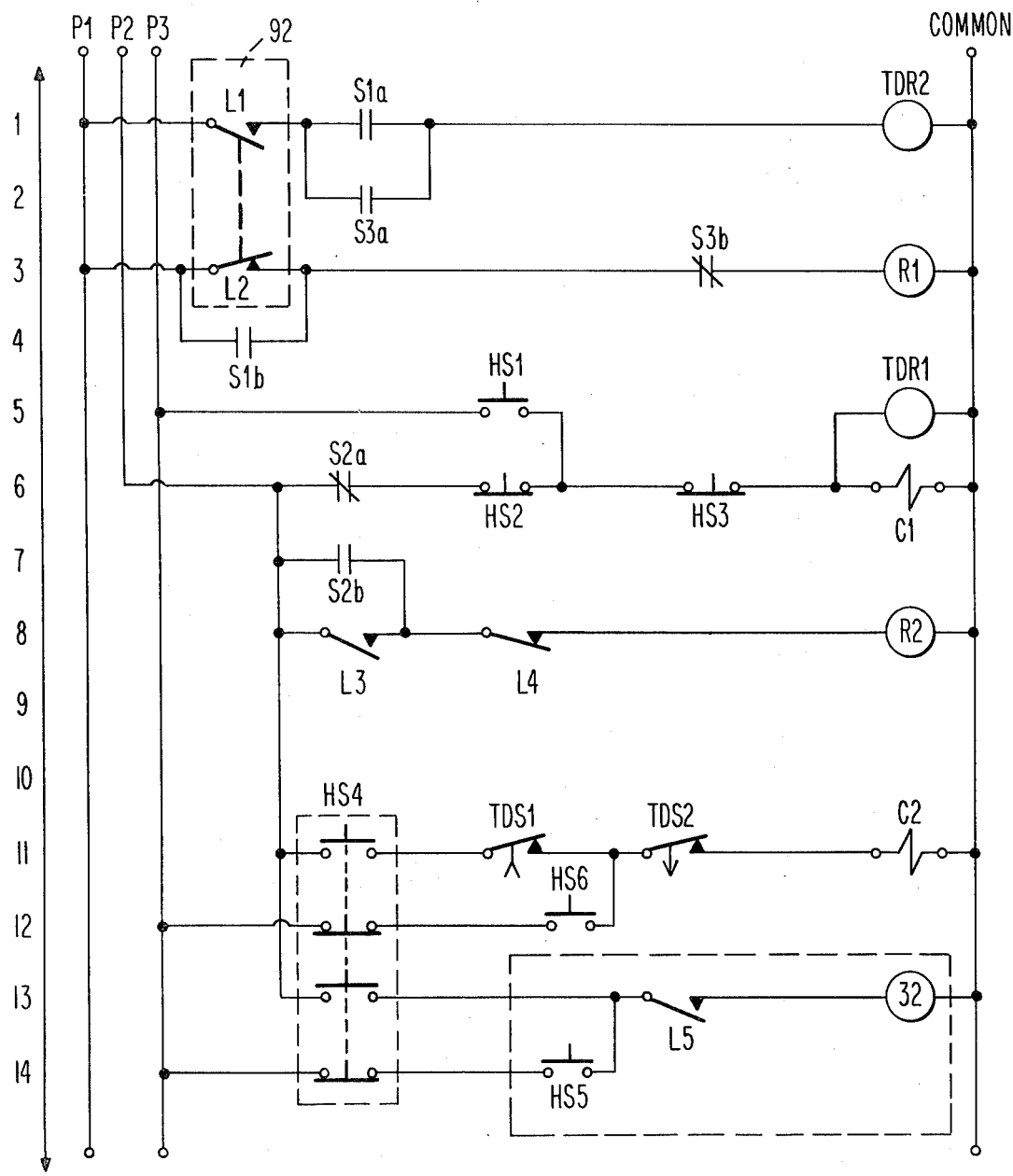
FIG. 6 is a schematic diagram of an electrical circuit portion of the apparatus.

Reference is now made to FIG. 6 which is a diagram of electrical circuitry of the present invention which controls the feeding of friction material from agitator 10 into stuffer hopper 48. The lines designated P1 and COMMON are the main electrical power lines. Switch L5 controls motor 32 and provides an electrical interlock whereby when agitator 10 is open, no mixing of friction material can take place. Line P2 provides power to the circuit elements when the apparatus of the present invention is feeding friction material in an automatic mode, to be described below. Line P2 is connected in parallel with electrical circuitry controlling plasticizing screw hydraulic drive motor 50 so that automatic feeding of friction material cannot occur unless plasticizing screw 52 is rotating. Line P3 provides power for operating portions of the present invention to feed friction material in a manual operating mode. Power to Line P3 is controlled by a manual switch not shown in the diagram.

Element 92 is a material level sensing means in stuffer hopper 48. Upper and lower limit switches L1 and L2 are mechanically tied and are actuated by the presence of friction material in stuffer hopper 48. S1a is a pair of normally open contact points actuated by relay R1 while S3a is a pair of normally open contact points actuated by a time delay relay TDR2; S1a and S3a provide a holding circuit for TDR2. TDR2 is an "off time delay relay"; when TDR2 is energized, it immediately opens normally closed switch TDS2. The timer portion of TDR2 begins to time only when TDR2 is deenergized. Once the timer portion of TDR2 has timed out, TDS2 closes. The timing function of TDR2 does not affect conventional relay contact points S3a or S3b, both actuated by TDR2. Contact points S3a are normally open and close when TDR2 is energized while contact points S3b are normally closed and open when TDR2 is energized. The timing function to TDR2 is adjustable so the time TDS2 remains open after TDR2 has been deenergized can be varied.

S1b is a pair of normally open contact points actuated by relay R1; S1b provides a holding circuit for R1. HS1, HS2 and HS3 are hand-actuated switches which are respectively normally open, normally closed and normally closed. These three switches allow hand control of TDR1 and C1. TDR1 is an "on time delay relay" with timing starting when TDR1 is energized. TDR1 opens normally closed pair of contact points TDS1 when it has timed out. Once deenergized, TDR1 allows points TDS1 to return to their normally closed position. Coil C1 controls air cylinder 76. When C1 is energized, air is supplied to cylinder 76 by opening a conventional valve thereby allowing compressed air to enter cylinder 76, causing a downward stroke of reciprocating plunger 44 and vertical rod 78. When C1 is de-energized, reciprocating plunger 44 and vertical rod 78 are returned to their starting position, where the downward stroke begins.

S2a and S2b respectively are normally closed and normally open pairs of contact points actuated by relay R2. L3 and L4 are the lower and upper limit switches actuated by lower and upper adjustable cam means 80 and 82 respectively. L3 is normally open and is closed only during contact with adjustable cam means 80, this contact defines the maximum downward travel of plunger 44. L4 is normally closed and is opened by adjustable cam means 82 at the maximum upward travel of plunger 44.

HS4 is a hand switch with four sets of contact points, two of which are normally opened and two of which are normally closed. Hand actuation of HS4 changes operation of the feeding system from the manual to the automatic mode. HS6 is a hand switch for manual operation of hydraulic motor 42 which powers flexible screw 40. Coil C2 when energized actuates a conventional hydraulic valve which controls the flow of hydraulic fluid to hydraulic motor 42. HS5 is a normally open hand actuated switch.

THE PROCESS FOR MOLDING BODIES OF FRICTION MATERIAL

In the fundamental, basic procedure used for molding bodies of friction material, the initial step in the method is that of mixing predetermined quantities of the dry ingredients of the friction material recipe. These are asbestos fibers, thermosetting resin powder and friction modifying and enhancing particles. These ingredients are mixed together to obtain a mixture which is dry and homogeneous, light and fluffy. This step of the process is a dry step. The light, fluffy characteristic of the mixture is due to the presence of the asbestos fibers. Accordingly, the initial step of the present method of manufacturing rigid bodies of friction material, to which the improvements of the present invention are applicable, is essentially the same initial step performed in prior art methods. This step creates the problems which are solved by the subsequent steps of the improved method of the present invention. By performance of this initial step, a light, fluffy mixture of friction material recipe, which is substantially incapable of simple division into incremental charges of consistently repeatable mass, is formed. With reference to FIG. 1, the mixing of the friction material could be performed at a location remote from the apparatus shown in FIG. 1 with the mixed recipe being transported to the apparatus shown in FIG. 1 in container 20. Alternatively, mixing could be performed proximate to agitator 10 and the mixed recipe fed directly thereinto. This feeding could be done by conveyor, flexible screw means or the like, all of which are within the scope of the present invention.

The next step of the method is the progressive partial plasticizing of the mixed friction material recipe, while the recipe is in an essentially undivided form, where the progressive partial plasticizing is performed within a closed environment. By performance of this step, the prior art procedures discussed above, which required weighing and trimming the mixed friction material recipe into small incremental preforms, are no longer needed. This means the health hazard due to release of asbestos into the air is also eliminated. This step of progressively partially plasticizing the mixed friction material recipe may be carried out by the performance of two substeps. These are the steps of progressively withdrawing mixed ingredients from a supply of mixed friction material and progressively moving the withdrawn mixed ingredients along a closed path to a position at which incremental charges are measured and formed. During the progressive movement of the withdrawn mixed friction material along the closed path heat and pressure may be applied, along at least a portion of the closed path, so that partial plasticization is thereby affected by the time the mixed friction material recipe reaches a position at which incremental charges are measured and formed. Upon completion of the partial plasticizing, the mixed friction material recipe is in a physical state in which it is capable of uniform density flow and is capable of being molded if molding is performed within a predetermined time after partial plasticization takes place. Again referring to FIG. 1, progressive withdrawal of the mixed ingredients from the supply is preferably performed by agitator 10, with horizontal shaft 28 and fingers 30 therewithin. Horizontal shaft 28 and fingers 30 preferably move mixed friction material recipe towards duct 38, where the mixed friction material recipe falls downwardly into contact with flexible screw 40. Upon rotation of flexible screw 40, the mixed friction material recipe is removed from the supply by movement through flexible feeder 22. Flexible feeder 22 progressively feeds the mixed friction material recipe into stuffer hopper 48 wherein the mixed friction material recipe is fed downwardly, by stuffing action of plunger 44, through orifice 49 into proximity with plasticizing screw 52. Partial plasticization of the friction material recipe is performed by rotation of screw 52 working the mixed friction material thereby applying pressure thereto and generating heat therewithin. Heat is provided by a conventional water jacket, affixed around plasticizing screw housing 54, and an associated water temperature control for additional heat input to the mixed friction material recipe as it is being partially plasticized. Still referring to FIG. 1, it is to be emphasized that all of this step is performed along a closed path whereby no friction material dust can escape to the surrounding air. Specifically, agitator 10 is closed, the juncture of agitator 10 and flexible feeder 22 at duct 38 is closed, flexible feeder 22 is closed as is the juncture of flexible feeder 22 and stuffer hopper 48. The juncture of stuffer hopper 48 and screw 52 at orifice 49 is closed and screw 52 is completely enclosed within plasticizing screw housing 54. Finally, cover sealing means 26 serves to seal the juncture between container 20 and agitator 10 thereby preventing the release of any mixed friction material to the air as the mixed friction material passes into agitator 10. Thus, at no time during the performance of this step, using the preferred apparatus shown in FIG. 1, is there any opportunity for friction material to escape to the air. Accordingly, the dust problem is eliminated.

The third step in the method of forming rigid friction material structures is the progressive division of the partially plasticized friction material recipe into incremental measured charges. Due to the uniform density of the partially plasticized friction material recipe, the friction material is now capable of being divided into incremental measured charges of substantially repeatable constant mass. Since the material is partially plasticized, it is not necessary to accomplish the division into the charges in a closed environment; in the partially plasticized state the material cannot release asbestos fibers to the surrounding environment. Details of the process of forming successive separate incremental measured charges is described beginning at column 2, line 73 of the 3,661,485 patent. Reference should also be made to FIGS. 4 through 9 of the 3,661,485 patent.

Once the preforms consisting of the separate incremental charges have been formed, they must be transferred from the forming location to the mold cavities in the molding press 18. Either the transfer apparatus shown in the 3,661,485 patent or the transfer apparatus shown in U.S. Pat. No. 3,741,691 may be employed for this step. The transfer apparatus of the 3,661,485 patent is described therein beginning in column 4, at line 9 thereof and is shown in FIGS. 1 and 3 thereof. The operation of the transfer apparatus is described in conjunction with the operation of the entire molding system beginning at column 5, line 5 of the 3,661,485 patent. The disclosure of U.S. Pat. No. 3,741,691 is hereby incorporated herein by reference. The transfer apparatus of the 3,741,691 patent is described therein beginning at column 6, line 22. The transfer apparatus is also shown in FIGS. 3 and 5 of 3,741,691. Operation of the transfer apparatus is described beginning at column 7, line 36 of 3,741,691. Any other suitable transfer apparatus may also be used for transferring the preforms from the location at which they are formed into cavities of a molding press.

The next step in the method of forming rigid bodies of friction material is to compression mold and thereby precure the partially plasticized preforms while these preforms are still moldable. It is to be understood that cure actually begins when the material is partially plasticized, but substantially all of the cure takes place during the compression molding with some slight final curing taking place in a post cure oven. The compression molding may be preformed with a molding press apparatus as shown or with any conventional molding press capable of applying the required heat and pressure to the preforms while they are in the mold cavities. The presses shown in the 3,661,485 and 3,741,691 patents are exceedingly suitable.

Once molding is completed, the next step is that of removing the molded rigid friction material bodies from the mold. This step is thought to be conventional and suitably performed by means of knock-out pins serving to push the molded rigid friction material from the mold cavities and a conventional comb which removes the bodies from the knock-out thereby allowing the bodies to exit from the compression molding press via duct or chute 64. Any other suitable molded part ejection and removal apparatus may also be used.

The final step for forming rigid friction material bodies is that of final curing of the molded rigid friction material bodies in a bake oven or the like. It is to be understood that any number of molded bodies may be cured simultaneously, the number is not limited to the number of bodies which can be made during one stroke of the press 18 or during any predetermined number of strokes of the press 18. The number of bodies which can be cured at a given time is limited only by the size of the oven available.

OPERATION OF THE INVENTION

The present invention provides closed closely controlled automatic meter feeding of friction materials and other high bulk thermoset materials from a remote closed agitator into a means for plasticizing or extruding the material.

A key feature of the present invention is its characteristic of automatically feeding the friction or other high bulk material at a controlled rate to the plasticizing or extruding means, shown as plasticizing screw 52 in FIG. 1, while keeping the friction or other high bulk material confined so that it will not escape to surrounding ambient air thereby contaminating surrounding ambient air and making the work area unsuitable for workers.

Feeding the material is initially accomplished by feeding material in remote agitator hopper 10 into spiral tubular material conveyor or flexible screw 40 through duct 38. As horizontal shaft 28 with fingers 30 rotates, it tends to keep the material in the agitator hopper agitated thereby preventing the material from bridging above the pick-up area of flexible screw 40. Agitation of the material by rotation of horizontal shaft 28 also acts to force the material in the agitator hopper from left to right in FIG. 1 into duct area 38.

The spiral tubular material conveyor or flexible screw 40 is rotationally driven by hydraulic motor 42 and feeds the friction or high bulk material from duct 38 of agitator hopper 10, through flexible feeder 22, along a spiral path into stuffer hopper 48.

Once the friction or other high bulk material has been discharged into stuffer hopper 48, the material is then force-fed through orifice 49 into contact with plasticizing screw 52. This feeding is accomplished by reciprocating plunger 44 with air cylinder 76.

Horizontal shaft 28 and fingers 30 associated therewith in agitator hopper 10, flexible screw 40, stuffer hopper 48 and its associated reciprocating plunger 44 function to feed the friction or high bulk material to plasticizing screw 52, through a closed system, at a suitable rate for operation of plasticizing screw 52. Accordingly, operation of horizontal shaft 28, flexible screw 40 and reciprocating plunger 44 must be coordinated so that all these elements act as one system to properly feed plasticizing screw 52. In order for plasticizing or extruding screw 52 to properly function, it must receive the friction or high bulk material at the same rate at which screw 52 can carry the friction or high bulk material away from orifice 49 through plasticizing screw housing 54 for deposit into a preform cup 70. Since friction and other high bulk materials are not free-flowing, these materials will "bridge" across orifice 49 thereby preventing plasticizing or extruding screw 52 from receiving any material. One function of reciprocating plunger 44 is to break up any bridging of material which occurs above orifice 49 and to stuff material down orifice 49 into contact with plasticizing screw 52. In this way, there is assurance that plasticizing screw 52 is receiving the friction or other high bulk material at least as fast as plasticizing screw 52 can remove material from orifice 49 by rotation.

For reciprocating plunger 44 to properly function, the rate at which friction material is fed into stuffer hopper 48 must be precisely controlled. This feed rate must be equal to the rate at which plasticizing screw 52 removes friction material from orifice 49. If the amount of material fed into stuffer hopper 48 is too small, too little material will move through plasticizing screw barrel 54, causing the material in barrel 54 to become too hot. This is unacceptable since the temperature of the material reaching preform cup 70 must be controlled to a close tolerance. If the temperature is too high, too much curing of the thermoset resin portion of the material will occur, making the molding of acceptable parts in press 18 impossible. If too much material is fed into stuffer hopper 48, the material will build up therein because plasticizing screw 52 will be unable to remove it quickly enough from orifice 49. This also is unacceptable because of the characteristic of friction or high bulk material whereby the material will not flow vertically when such buildup begins. Reciprocating plunger 44 makes only a hole through the built-up material and the built up walls of material do not collapse, an effect called "rat-holing". The result again is that any material in plasticizing screw barrel 54 overheats because insufficient material is present therein.

For controlling the rate of feed of friction material to the plasticizing screw, three controls are provided. A first control is a valve means for controlling the rate of hydraulic fluid flow in the hydraulic fluid line connected to hydraulic motor 42. This flow control is conventional, is preferably hand operated and is not shown in the drawings. It is preset for a given type of material which is fed into stuffer hopper 48. Normally once a proper setting is determined for this flow control, for a given type of material which is being fed, the flow control need not be further adjusted. This flow control provides means for adjusting the speed of hydraulic motor 42 thereby adjusting the speed at which flexible screw 40 rotates. The speed at which flexible screw 40 rotates controls the rate of feed of the friction mateial into stuffer hopper 48. Unfortunately, due to the nature of friction and other high bulk materials, with their inconsistent, nonhomogenous make-up, a constant rate of feed of friction or other high bulk material into stuffer hopper 48 will not permit the degree of control of the amount of friction material in hopper 48 which is required for successful operation of the reciprocating plunger 44. Accordingly, a second control is needed.

The second control is a time control preferably consisting of first time delay relay TDR1 controlling coil C2 which activates a conventional input electrical circuit, not shown, which serves to actuate a conventional hydraulic valve, not shown, which controls fluid flow to hydraulic motor 42. First time delay relay TDR1 is actuated when reciprocating plunger 44 starts its downward stroke. Time delay relay TDR1 has associated therewith a preset time upon the elapse of which, after actuation of TDR1, TDR1 is said to "time-out". When TDR1 times out, it opens TDS1 in the input circuit to coil C2 thereby closing the hydraulic valve, denying hydraulic fluid to the hydraulic motor 42 thereby stopping rotation of the flexible screw 40 and haulting feeding of friction material into stuffer hopper 48. TDR1 is preferably adjustable so that it can be set to a suitable time whereupon it will stop any overfeeding of friction material.

A third control used for control of feed rate of the friction material through orifice 49 to plasticizing screw 52 is level sensing means 92 to sense the level of friction material in stuffer hopper 48. Any suitable sensing means may be used to sense this material level. One such suitable means is that shown in the 3,225,963 patent and described therein beginning in column 2 at line 25. Other suitable means include mechanical limit switch type sensing means wherein a mechanical arm will be deflected upon material in stuffer hopper 48 reaching an excessively high level, shown schematically in FIG. 6. Whatever level sensing means is used, it is connected to electrical circuitry for control of hydraulic fluid to hydraulic motor 42. So long as the level of material is maintained below a critical high level in stuffer hopper 48, reciprocating plunger 44 will successfully stuff material through orifice 49 into proximity with plasticizing screw 52.

During normal operation, plasticizing screw 52 rotates only while a preform is being formed into preform cup 70. Reciprocating plunger 44 operates only while plasticizing screw 52 is rotating. This operation of reciprocating plunger 44 in conjunction with plasticizing screw 52 is controlled by step switch circuitry which controls the sequence of making preforms. The preferred step switch circuitry and its operation is described in the 3,661,485 patent, beginning in column 4 at line 43. The electrical power supply controlling the feed of air to air cylinder 76, the feed of electricity to motor 32 and the feed of hydraulic fluid to hydraulic motor 42 is preferably connected in parallel with the source of electrical power controlling operation of plasticizing screw motor 50. Thus, only when plasticizing screw 50 is operative and rotating will friction material be fed from agitator hopper 10 through flexible feeder 22 into stuffer hopper 48 through orifice 49 and into proximity with plasticizing screw 53.

The level sensing means 92 in stuffer hopper 48 is a safety device which normally functions only in the event of a failure of TDR1. During normal operation TDR1 exclusively will serve to control the operation of air cylinder 76, reciprocating plunger 44 and vertical shaft 46.

During normal automatic operation the sequencing of TDR1 is as follows. Initially, assume plasticizing screw 52 is rotating thereby feeding at least partially plasticized material into preform cup 70. Air cylinder 76 is actuated thereby initiating downward travel of reciprocating plunger 44 and rod 78. Upper adjustable cam means 80, slidably affixed to rod 78, moves downward thereby allowing top limit switch L4 to close which in turn triggers TDR1 by deenergizing R2 thereby allowing S2a to return to the normally closed state. This actuates the timer associated with TDR1. When reciprocating plunger 44 reaches the bottom extremity of its travel, lower adjustable cam means 82 contacts bottom limit switch L3 which energizes R2 thereby opening S2a and deenergizing C1 and TDR1. This reverses the air flow into cylinder 76 thus causing reciprocating plunger 44 to rise to its upper extremity where another reciprocating of reciprocating plunger 44 is begun. Note that if TDR1 times out, reciprocating plunger 44 continues its travel, it does not stop upon completion of the preset time. The function of TDR1 is to control operation of hydraulic motor 42, which drives flexible screw 40, not to control operation of reciprocating plunger 44. Either of two events makes the piston in cylinder 76 travel to its upper extremity whereupon it is ready to begin another downward stroke; these two events are (1) stopping the plasticizing screw 52, which means that preform cup 70 is full or (2) allowing reciprocating plunger 44 to reach a lower extremity of travel whereupon lower adjustable cam means 82 actuates bottom limit switch L3. If TDR1 times out during a downward portion of a reciprocation of reciprocating plunger 44, this signifies that friction or high bulk material is well packed below reciprocating plunger 44, filling orifice 49 and is good contact with plasticizing screw 52. If reciprocating plunger 44 is contacting friction material in stuffer hopper 48 when TDR1 times out, reciprocating plunger 44 does not reach a stall condition because plasticizing screw 52 continues to rotate thereby continuously removing material from orifice 49; accordingly reciprocating plunger 44 continues to travel downwardly. If plasticizing screw 52 stops rotating due to shut off of electrical power, the consequent deenergizing of coil C1 causes reciprocating plunger 44 to return to its extreme top position to begin another downward portion of a reciprocation upon reconnection of electrical power to plasticizing screw 52.

Reference is again made to FIG. 6. When the feeding mechanism of the present invention is operated manually, power is supplied through line P3. Actuation of HS1 energizes C1, thereby causing reciprocating of the piston in air cylinder 76 with consequent reciprocation of plunger 44 and actuation of TDR1. However this actuation of TDR1 need have no effect on operation of the feeding mechanism since TDS1 may be effectively bypassed by actuation of HS6. Assuming TDS2 is in its normally closed position, actuation of HS6 will actuate C2 which initiates operation of hydraulic motor 42, thereby providing feed of friction material to stuffer hopper 48. Similarly, manual actuation of HS5 energizes electric motor 32 thereby rotating horizontal shaft 28, assuming that L5 is in its closed position, indicating that the cover interlock on agitator 10 is operative.

Note that when operating in the manual mode, level sensing means 92 and TDR2 are both operative from power supplied through line P1. This means that even in the manual operating mode, if stuffer hopper 48 becomes too full of material, TDR2 will be actuated, thereby opening TDS2 and thereby stopping operation of hydraulic motor 42 halting feeding of friction material into stuffer hopper 48. Level sensing means 92 and TDR2 operate in the same fashion when the feeding mechanism is operating in the automatic mode since power is always supplied through line P1 no matter which mode of operation is being used.

Reference is again made to FIG. 6 for consideration of the operation of the circuit of the present invention when the feeding apparatus of the present invention is operating in the preferred automatic feed mode. HS4 is a selector switch which the operator uses to select either the automatic or manual mode of operation. As shown in FIG. 6, HS4 is in position for manual operation. While operating in the automatic mode, HS4 is actuated, from the state shown in FIG. 6, thereby making the circuits in reference lines 11 and 13 and breaking the circuits in reference lines 12 and 14. Referring to reference lines 1, 2, 3, and 4, so long as the level of friction material in stuffer hopper 48 is below that at which L1 is closed, L2 will remain closed, thereby energizing R1 which in turn causes S1a and S1b to be actuated from their normally open positions to closed positions. Upon the material in stuffer hopper 48 reaching the maximum allowable level, L1 will close, thereby opening L2. R1 will remain energized due to closed S1b. Once L1 closes, TDR2 is energized since S1a is closed. Upon TDR2 being energized, S3a closes, S3b opens and TDS2 opens thereby halting feed of friction material by deenergizing coil C2 which controls hydraulic motor 42. TDS2 remains open, thereby preventing the feeding of friction material, until TDR2 has been deenergized, by the level of material in stuffer hopper 48 dropping thereby deactuating L2, and the timer portion of TDR2 has timed out. S3a and S3b respectively close and open immediately upon TDR2 energizing since S3a and S3b are not connected to the timing function of TDR2. Once the level of friction material in stuffer hopper 48 has dropped below the maximum allowable level, L1 opens and L2 closes, thereby energizing R1. This closes S1b thereby providing a hold circuit for R1. Upon L1 opening, TDR2 is no longer energized and S3b returns to its normally closed position. TDS2 returns to its normally closed state after the timing function of TDR2 has finished.

TDR1 begins to time when it is energized with C1 which actuates a valve in an air line to cylinder 76. When C1 is energized, the piston in cylinder 76 begins its downward stroke, thereby causing plunger 44 and rod 78 to begin the downward portion of a reciprocation. Accordingly, TDR1 begins to time when plunger 44 starts down. S2a is normally closed and is actuated by R2. When C1 is actuated and the piston in cylinder 76 begins its downward travel, R2 is not energized and S2a is in its normally closed position. L4 is in its normally closed position, having closed immediately upon upper adjustable cam means 82 moving away from L4 upon the downward movement of extended rod-like portion 78. Once the piston in cylinder 76 starts downward, it continues downward until lower adjustable cam means 80 closes normally open L3. This energizes R2 thereby opening S2a and closing S2b. Closure of S2b provides a holding circuit which maintains R2 in the energized state. When S2a opens, C1 is de-energized thereby causing piston in cylinder 76 to travel upwardly from its extreme downward position. TDR1 is also de-energized. The piston in cylinder 76 continues to move upwardly until upper adjustable cam means 82 opens normally closed L4. This de-energizes R2, thereby allowing S2a and S2b to open to their normally closed and normally open states respectively. When S2a closes, C1 is energized and the piston begins another downward stroke. Thus, once drive motor 50 for plasticizing screw 52 is actuated and HS4 is in position for automatic operation, the piston in cylinder 76 will begin to reciprocate.

Clearly, each time the piston in cylinder 76 reciprocates upon actuation of C1, TDR1 is also energized and begins to time. When TDR1 times out, normally closed TDS1 opens thereby de-energizing C2. This stops hydraulic motor 42, halting feeding of friction material into stuffer hopper 48. TDS1 closes when TDR1 is energized again at the start of another downward stroke of the plunger. TDS2 opens upon TDR2 being energized, remains open even while TDR2 is timing after being deenergized and closes only when TDR2 has timed out. As noted above, TDR2 is only actuated when the level sensor 92 senses that friction material has accumulated to the maximum allowable level in stuffer hopper 48. Thus, TDR1 and TDR2 operate together to actuate C2 and control hydraulic motor 42.

This operation is as follows. TDR1 is energized and begins to time each time plunger 44 initiates a downward stroke. If a reciprocation of plunger 44 is completed before TDR1 times out, TDR1 will initiate timing upon the start of the next downward stroke of plunger 44. Energizing TDR1 on a second downward stroke of plunger 44 before TDR1 has timed out from the previous stroke of plunger 44 will cause TDS1 to remain closed. In this condition C2 will remain energized and hydraulic motor 42 will continue to operate screw 40 thereby continuing the feed of friction material into stuffer hopper 48. Once stuffer hopper 48 becomes sufficiently full of material that a downward stroke of plunger 44 is impeded by the presence of the material to the extent that a full reciprocation of plunger 44 exceeds the time to which the timer portion of TDR1 has been set, TDS1 will open thereby halting feed of material into stuffer hopper 48. In such case, TDS1 will remain open until TDR1 is again energized when plunger 44 has completed its downward stroke and has returned to its extreme upward position. Thus, when so much material has been fed into stuffer hopper 48 that plunger 44 requires an extended time to complete a single reciprocation, the feed of material into stuffer hopper 48 will be halted until plunger 44 has begun another downward reciprocation, thereby stuffing more material through orifice 49.

In the event the level of material in stuffer hopper 48 exceeds the maximum allowable level, thereby closing normally open L1 and energizing TDR2, TDS2 is immediately opened, thereby de-energizing C2, stopping hydraulic motor 42 and halting the feed of friction material into stuffer hopper 48. TDS2 remains open so long as TDR2 is energized, and for the period after TDR2 is deenergized, until TDR2 times out. Only after TDR2 times out will TDS2 close, thereby energizing C2, operating hydraulic motor 42 and thereby feeding more friction material into stuffer hopper 48. TDR2 does not start to time until it is deenergized by L1 opening due to a drop in the level of friction material in stuffer hopper 48. The time interval to which the timer portion of TDR2 is normally set is sufficiently long to allow plunger 44 to perform at least a major portion of one reciprocation. Thus TDS2 once open will not close until the level of friction material in stuffer hopper 48 has dropped below the maximum allowable high level and plunger 44 has forced some of the friction material in stuffer hopper 48 through orifice 49 into contact with plasticizing screw 52. In this way TDR1 and TDR2, by actuating TDS1 and TDS2 respectively, prevent the level of friction material in stuffer hopper 48 from exceeding the maximum allowable level at which rat holing starts to occur and allow plunger 44 to stuff some material through orifice 49 before stuffer hopper 48 is again completely refilled. This is the process of "starve feeding" without which plunger 44 cannot successfully feed friction material through orifice 49 into contact with plasticizing screw 52.

Electric motor 32 driving horizontal rotating shaft 28 runs continuously when the feeding apparatus of the present invention is operating in the automatic mode, so long as normally open L5 is closed by a cover or sealing means 26 at the top portion of agitator 10. Thus, the material in agitator 20 is continuously agitated and mixed without regard to whether any material is being removed from agitator 10 by means of flexible screw 40.

With reference to FIG. 1 and the fundamental process for molding bodies of friction material described above, it is to be understood that the flexible screw 40 performs the initial portion of the procedure whereby the progressively withdrawn mixture of friction material is progressively moved along a closed path to a position where the material is at least partially plasticized. Reciprocating plunger 44 operating inside stuffer hopper 48 and plasticizing screw 52 move the progressively withdrawn mixture along a remaining portion of the closed path. Flexible screw 40 is primarily to perform the moving function. However, inevitably some compaction or compression of the friction material recipe mixture may occur. Primarily, initial compression of the mixture is performed by successive reciprocations of plunger 44 which stuffs and compresses increments of the mixed friction material recipe in stuffer hopper 48 through orifice 49 and into contact with plasticizing screw 52. Rotation of plasticizing screw 52 performs the final portion of the compression which is necessary to affect partial plasticization of the mixed friction material recipe as the friction material recipe moves along the closed path, until the friction material reaches preform cup 70 which is a preform or charge measuring and forming location. Heat for partially plasticizing the mixed friction material recipe is generated through the application of rotational work to the mixed friction material recipe by rotation of plasticizing screw 52 with any additional required heat being supplied by heaters which are thermally connected to plasticizing screw housing 54. These heaters may be electrical heaters or may be in the form of a loop of heated liquid running circumferentially around plasticizing screw housing 54. Any other suitable heating means may also be used. A typical temperature of the partially plasticized material as it exits housing 54 and is formed into a preform at cup 70 is in the neighborhood of 240° F.

The size of the preform formed in preform cup 70 is dependent on the length of time plasticizing screw 52 rotates. Preform cup 70 is not required to be the same size as the preform which is to be formed; preform cup 70 is only required to be sufficiently large to encompass sufficient mass for the largest molded friction material body. For a further description of control of the size of the preform, refer to column 3, line 21 of the 3,661,485 patent.

The degree of plasticization of the mixed friction material recipe which is extruded into preform cup 70 is adjustably controllable by varying the annular spacing between conical leading edge of plasticizing screw 52 and tapered front wall of plasticizing screw-housing 54 which is adjacent the orifice through which the partially plasticized material exits into preform cup 70. See the 3,661,485 patent beginning in column 2, line 64 thereof. It will be understood that the forming of preforms is an intermittent, discrete procedure and that plasticizing screw 52 is not run continuously but is run only as required to form a preform in preform cup 70. Accordingly, the progressive movement of the mixed friction material recipie along the closed path is intermittently continuous due to the intermittent operation of plasticizing screw 52.

Molding of the rigid friction material bodies in press 18 must be performed reasonably quickly after one or more preforms are formed. Each preform or charge is in at least a partially plasticized condition and is capable of being molded if and only if the molding operation is performed within a predetermined time after the preform is formed. The ability of the preform to be molded diminishes with the passage of time. Ideally, molding is performed within a very few minutes after a preform is formed. Typical mold cycle times range from about 60 to about 180 seconds with a 90 second mold cycle time being typical. The preforms, while in the mold, are typically molded at temperatures of from about 300° F. to about 320° F. with 310° F. being a typical temperature. The pressure applied by molding press 18 to the preforms as they are molded ranges from about 1750 psi to about 2250 psi with a typical pressure being 2000 psi.

A typical mold, the halves of which are attached to fixed and moveable platens 58 and 60, might have six mold cavities therein. This would require that six preforms be formed for each molding cycle. It has been found that operating with a single plasticizing screw and preform cup that six preforms can be formed easily during a 90 second mold cycle, while the previous batch of six preforms is being molded. It is to be understood that the present invention is not limited in terms of the number of preforms which are formed per mold cavity nor is it limited to any particular number of preforms which must be accumulated before loading the molds. The number of preforms formed for each mold cavity and the number of cavities loaded with preforms for each cycle of the molding press 18 can be varied, depending on the end product which is being manufactured and the operating characteristics of the equipment which is utilized, without affecting the scope of the present invention.

The molded rigid friction material bodies are ejected from the molding press 18 by suitable means at the termination of each cycle of the molding press. The friction material bodies fall through duct 64 and may be caught in any suitable container for movement to curing ovens. It is not necessary that the molded friction material bodies be reoriented in the containers before being placed into the ovens.

It is to be understood that even though the invention described herein concerns a method and apparatus which are specifically applicable to the production of disk brake pads for automobiles and brake blocks for trucks and railroad rolling stock, the present invention has applicability to the production of other rigid or semi-rigid bodies which are molded from friction material recipes, such as brake linings for drum brakes, clutch facings and the like.

The objects of the present invention have been fully and completely met by the apparatus and methods described herein. Preferred embodiments have been shown for the purpose of illustrating the present invention. However, the present invention is not to be deemed to be limited to the embodiments described herein. This invention includes all embodiments and modifications which are encompassed within the scope of the claims appended hereto.

I claim:

1. A method of producing molded bodies of friction material, such as brake pads and brake blocks, comprising:
    (a) mixing predetermined quantities of dry friction material including asbestos fibers, thermosetting resin powder and friction modifying particles to obtain a supply of light and fluffy, dry homogeneously mixed ingredients;
    (b) conveying said mixed ingredients from said supply through a closed dust-tight path comprising seriatim an enclosed mechanical conveyor, a closed stuffer hopper and an enclosed plasticizing screw, to an extrusion orifice defining termination of said path;
    (c) metering arrival of said mixed ingredients at said extrusion orifice by controlling relative feed rates of said mechanical conveyor, stuffing means in said stuffer hopper and said plasticizing screw,
    (d) heating said mixed ingredients within said plasticizing screw enclosure to plasticize the resin powder thereby forming plastizied ingredients at said extrusion orifice;
    (e) extruding a portion of said plasticized ingredients through said orifice into a preform cup thereby forming an incremental charge;
    (f) disengaging said incremental charge in said cup from plasticized ingredients remaining at said orifice;
    (g) molding said incremental charge into a molded shape under heat and pressure to form a precured molded body; and
    (h) heating said precured molded body until cured.

2. The method of claim 1 wherein conveying is performed intermittently.

3. The method of claim 2 wherein mixing is performed continuously.

4. The method of claim 3 wherein conveying is performed only while extruding.

5. The method of claim 1 wherein a plurality of incremental charges of plasticized mixed ingredients are simultaneously formed as plasticized ingredients are extruded through said orifice into a plurality of preform cups.

6. A method as defined in claim 1 wherein said ingredients are mixed in a plurality of supplies and wherein said supplies are depleted seriatim by conveyance of mixed ingredients a lower portion of each supply.

7. The method of claim 6 wherein said mixed ingredients are initially conveyed from said supply through a duct connecting a supply hopper to said enclosed mechanical conveyor.

8. The method of claim 7 wherein said supplies are depleted by progressive movement of mixed ingredients across a lower portion of said supply hopper as conveying occurs.

9. A method as defined in claim 5 wherein a predetermined number of charges are simultaneously molded while at least several times said predetermined number of bodies are simultaneously cured under heat.

10. A method as defined in claim 1 wherein conveying said mixed ingredients through said closed mechanical conveyor portion of said closed path is performed by rotating a flexible auger-like screw within a concentric elongated flexible cylindrical housing and wherein mixing said dry friction material is performed by rotating a horizontal shaft having axially spaced radially extending fingers contacting said material during at least a portion of each shaft rotation.

11. In a method of producing molded bodies of friction material including the steps of:
    (a) charging a chamber through an aperture with a supply of light and fluffy dry homogeneously mixed friction material ingredients including predetermined quantities of asbestos fibers, thermosetting resin powder and friction modifying particles;
    (b) closing said aperture;
    (c) withdrawing mixed ingredients from said chamber through a withdrawal duct;
    (d) conveying withdrawn mixed ingredients through a closed dust-tight transport path connecting said withdrawal duct to an extrusion orifice;
    (e) heating and working said mixed ingredients within a portion of said transport path proximate said extrusion orifice to plasticize the resin powder thereby forming a plasticized mass of ingredients at said extrusion orifice;
    (f) extruding a portion of said plasticized mass through said orifice into an open cup to form an incremental charge of plasticized friction material;
    (g) disengaging said incremental charge in said cup from plasticized mass remaining at said orifice;
    (h) transporting said incremental charge from said cup to a cavity of a molding press;
    (i) molding said incremental charge into a molded shape under heat and pressure to form a precured molded body; and
    (j) heating said precured molded body until cured;
that improvement comprising conveying said mixed ingredients, after withdrawal from said chamber through said duct, through a closed unheated mechanical conveyor forming an initial portion of said closed dust-tight path immediately downstream of said duct and leading into a closed stuffer hopper forming an intermediate portion of said closed dust-tight path at a rate to starve-feed said closed stuffer hopper by controlling feed rate of said closed mechanical conveyor, and then into proximity with an enclosed plasticized screw forming a final portion of said closed path by forcing said mixed ingredients through a discharge orifice of said stuffer hopper into said plasticizing screw enclosure with reciprocable stuffing means in said stuffer hopper.

12. The method of claim 11 wherein withdrawing and conveying are performed at an average rate of friction material mass transfer corresponding to a mass transfer rate at which plasticized friction material is extruded into said preform cup to form said incremental charge.

13. The method of claim 12 wherein conveying is performed and said stuffing means reciprocates only while extruding.

14. A process for producing moldable preforms of friction material comprising:
 (a) charging a light and fluffy homogeneous mixture of dry friction material consisting essentially of asbestos fibers, thermosetting resin powder and friction modifying and enhancing particles into a closeable agitator hopper through a fill port,
 (b) closing said fill port,
 (c) agitating and thereby forwarding said mixture along the bottom of said agitator hopper to a discharge duct forming an initial portion of a closed dust-tight friction material transport path leading to a friction material measuring and forming position, said transport path including a closed mechanical conveyor, a closed stuffer hopper and an enclosed plasticizing screw disposed seriatim downstream of said duct,
 (d) conveying said mixture through said dust-tight transport path while applying heat and pressure to said mixture at said plasticizing screw to at least partially plasticize said mixture,
 (e) measuring and forming said at least partially plasticized mixture into preforms by extruding said homogeneous mixture, via rotation of said plasticizing screw, through an extrusion orifice at an end of a housing enclosing said plasticizing screw and into an open receptacle of preselected volume, said orifice defining termination of said closed path.

15. The process of claim 14 wherein agitating is performed continuously.

16. The process of claim 15 wherein said closed mechanical conveyor operates intermittently.

17. The process of claim 16 wherein said closed mechanical conveyor operates only while said plasticizing screw rotates.

18. The process of claim 17 wherein stuffing means in said hopper operates periodically, forcing friction material out of said stuffer hopper through a bottom discharge aperture and into said housing enclosing said plasticizing screw at a location on said screw housing remote said extrusion orifice.

* * * * *